United States Patent Office 3,020,780
Patented Feb. 13, 1962

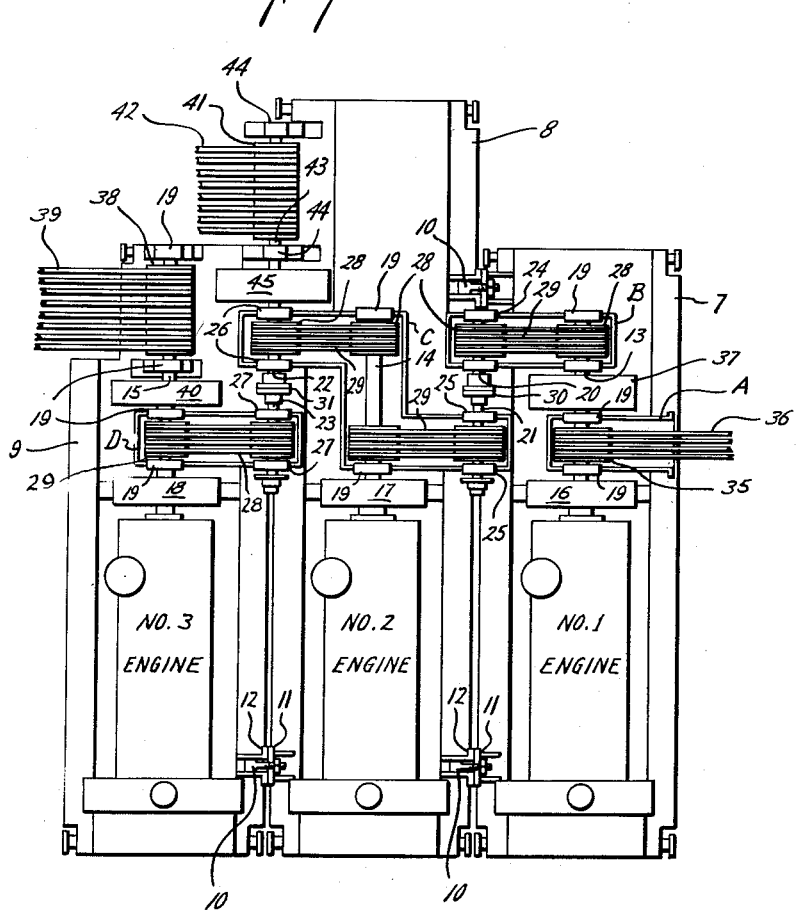

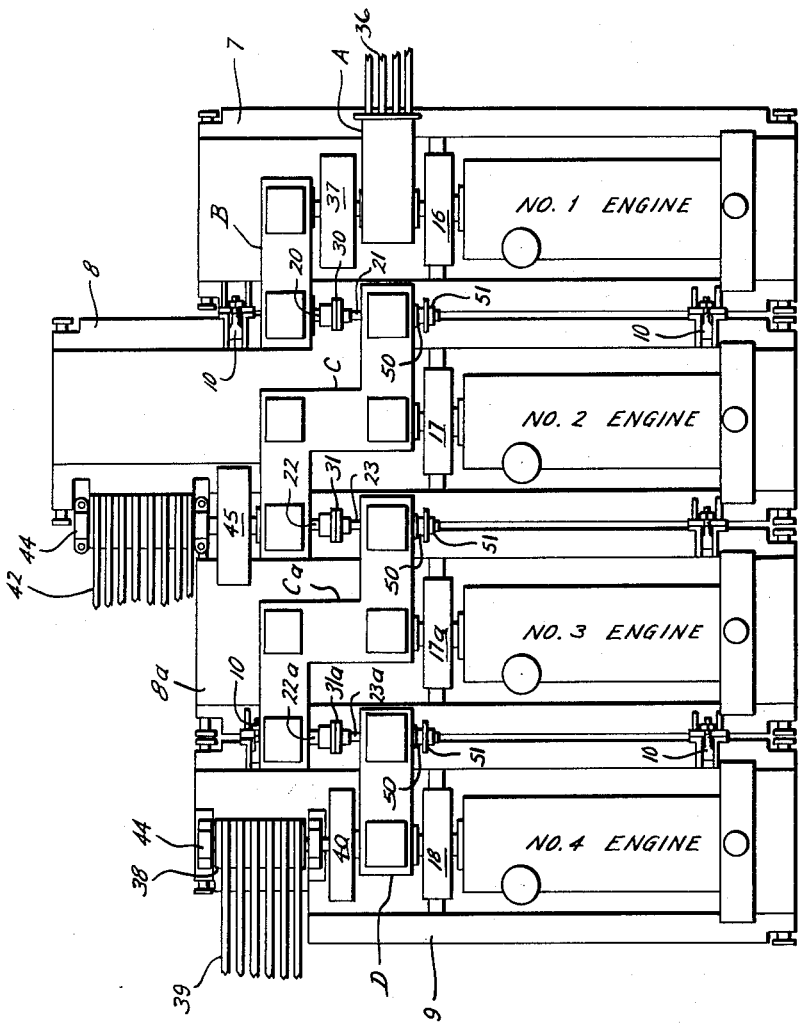

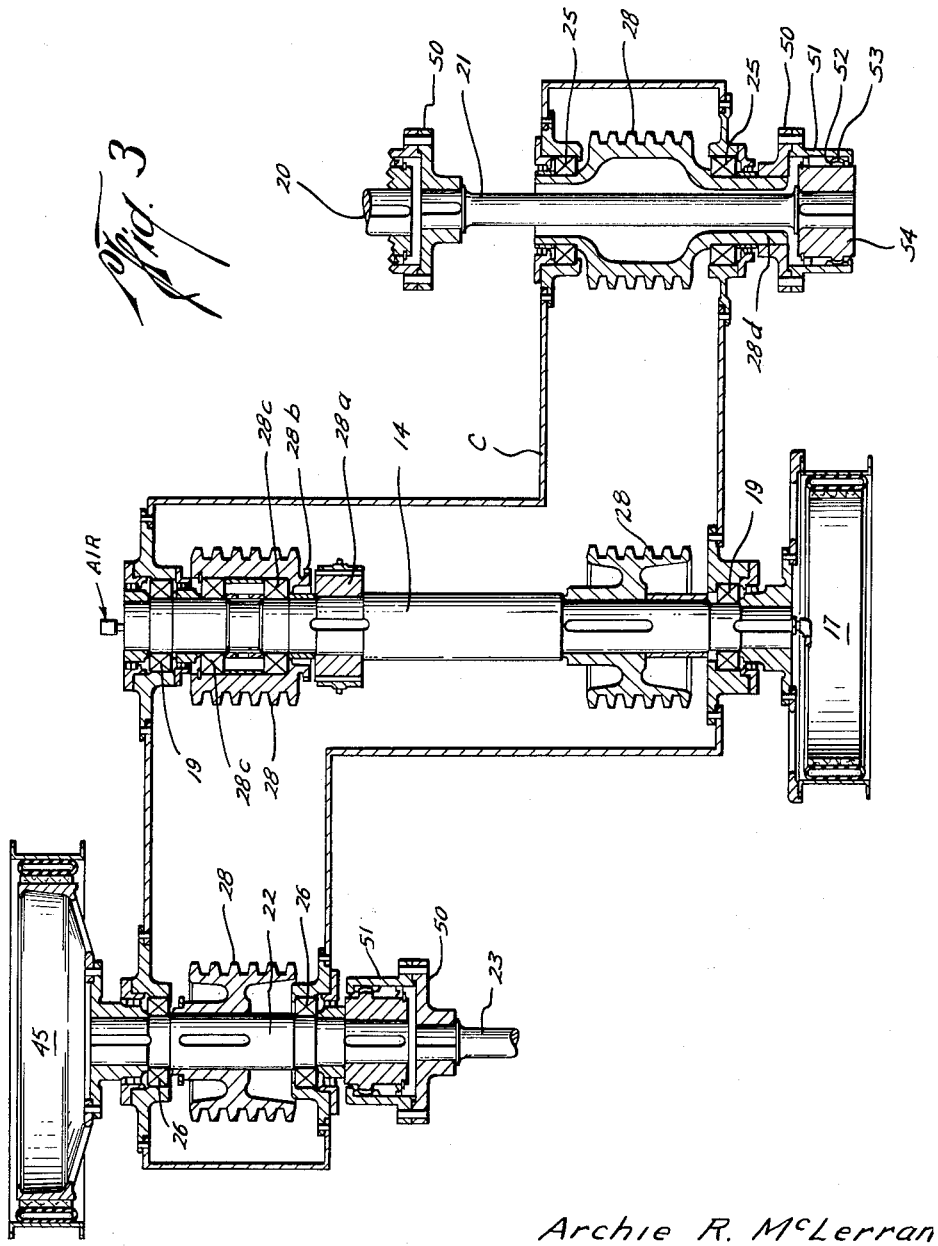

3,020,780
COMPOUND DRIVE ASSEMBLY
Archie R. McLerran, Beaumont, Tex., assignor, by mesne assignments, to Dresser Industries, Inc., Dallas, Tex., a corporation of Delaware
Filed Oct. 31, 1958, Ser. No. 771,032
6 Claims. (Cl. 74—665)

This invention relates to an improved compound drive assembly and more particularly to such an assembly which can be readily separated into individually transportable sections.

It is frequently necessary to interconnect or compound two or more prime movers or engines by a compound drive assembly so that the combined output power of the engines can be delivered to one or more driven mechanisms. For some operations, it is desirable that such a compound drive assembly be flexible in operation and readily transportable. For example, oil well drilling rigs frequently have two to four or more engines which are interconnected by a compound drive assembly so that the power from any one or all of the engines can be delivered to the draw works or to one or more pumps or other apparatus.

The compound drive assembly usually comprises a series of sprockets and chains or pulleys and belts interconnecting the various engines with each other and with the draw works and pumps. Clutches are provided so that power can be routed in the desired manner and so that one or more engines can be disconnected from the assembly. Usually each engine is mounted upon a portable base or skid so that it can be readily moved from place to place. Such moving requires the disconnection of the compound drive assembly between the various prime movers and this has naturally presented a problem. For example, in some drives it is necessary to remove the protective housings from around the chains and sprockets connecting the engines and then to dismantle the chains so that the individual skid mounted units can be moved. Such a procedure is not only quite time consuming but frequently results in sand, dirt and other debris fouling the chains and sprockets. Also, there is a problem of properly aligning the various skid mounted units after moving the same so that upon reassembling the compound drive, the various chains and sprockets will be in proper alignment.

It is accordingly one object of this invention to provide a compound drive assembly which is readily separable into individually transportable sections by disconnecting a relatively simple drive connection between two shafts.

Another object of the invention is to provide an improved compound drive assembly which can be separated into readily transportable sections without moving any of the various shafts, sprockets, pulleys, chains or belts or the like from their normal operating position whereby the various elements can be fixedly mounted on a base in accurately aligned positions which are not disturbed during the moving operation.

Another object of the invention is to provide a compound drive assembly which permits the use of four or more power units in which the power units intermediate the end units may be interchanged with each other to change their relative position and also which permits additional intermediate power units having the same drive assembly configuration to be added.

Another object of the invention is to provide a compound drive assembly in which the power units need not be accurately aligned with each other and yet the units can be satisfactorily interconnected.

Another object of the invention is to provide a connection between two power units of a compound drive assembly which connection permits of substantial misalignment between the units.

Other objects, advantages and features of the invention will be apparent to one skilled in the art on the consideration of the written specification, the appended claims and the attached drawings wherein:

FIG. 1 is a plan view illustrating one embodiment of the compound drive assembly of this invention and shows the principle thereof applied to a three engine power supply and further illustrates somewhat schematically, the various connections between the power units;

FIG. 2 is a view somewhat similar to FIG. 1 except it illustrates the invention applied to a power supply having four power units; and FIG. 3 is an enlarged detailed view of a portion of the compound drive assembly illustrated in FIGS. 1 and 2.

In accordance with this invention, a plurality of power units, each including at least one prime mover, are separately mounted on individual base supports. The drive shafts of the prime movers on adjacent power units are drivingly connected to each other through a pair of stub shafts. One of the stub shafts is mounted in a fixed position on the base of one power unit and the other stub shaft on the base of the adjacent power unit. A disconnectable connection is provided between the two stub shafts so that power can be transferred from one stub shaft to the other and yet, upon disconnection of this connection, the individual power units can be separately transported from one place to another.

In accordance with another concept of this invention, the driving connections between a drive shaft and the stub shafts to either side of the drive shaft are laterally offset from each other so that these drive connections, along with the drive shaft are arranged to have a substantially Z-shaped configuration plan view. By such an arrangement, the intermediate power units of the power supply can be interchanged with each other and also additional intermediate power units can be added without any modification of the drive assembly.

As another concept, the invention provides an arrangement of adjacent stub shafts which permits moderate misalignment between adjacent power units. Thus, at least one stub shaft of a pair is extended through a hollow drive element, such as a sprocket or pulley, and is connected at its ends by flexible connections to the drive element and the other stub shaft. This permits the flexibly connected stub shaft to rotate about an axis which is inclined at an angle with the axis of the other stub shaft and/or with the axis of the drive element. It affords a very compact arrangement while yet permitting substantial misalignment between the adjacent power units.

Referring now to FIG. 1, there is illustrated a three-unit power supply comprising No. 1 through No. 3 engines each of which are individually mounted upon a support base, such as skids 7, 8 and 9. When disposed in side-by-side relationship or shown in FIG. 1, the skids can be connected together as by eye-bolts 10 pivoted to one skid and adapted to swing down between abutment plates 11 and 12 on adjacent skids so as to firmly hold the skids together in proximate alignment with each other. Other skid connecting means can be used if desired. The respective engines are connected to drive shafts 13, 14 and 15, preferably through clutches 16, 17 and 18. The latter may be of any suitable type such as a Fawick air clutch as illustrated at pages 1776–77 in the 22nd edition of the Composite Catalog of Oil Field Equipment and Services. The drive shafts are rotatably mounted upon the respective bases or skids in predetermined aligned relationship with their respective engines as by bearings 19. Bearings 19 can be of any suitable type and can be mounted upon the skids by the use of pedestals or, as here illustrated, by attachment to the drive housings or casings A, B, C and D which in turn are fixedly connected to the respective skids.

Means are provided for drivingly interconnecting adjacent drive shafts including pairs of aligned stub shafts 20, 21 and 22, 23 respectively disposed between adjacent drive shafts 13, 14 and 14, 15. Means are also provided for rotatably mounting one stub shaft of a pair upon a skid and the other stub shaft of the same pair upon the next adjacent skid. Thus, a stub shaft 20 is rotatably mounted upon skid 7 by suitable means such as bearings 24. Stub shafts 21 and 22 are similarly mounted, as by bearings 25 and 26, respectively, on skid 8 on opposite sides of the drive shaft 14. Similarly, stub shaft 23 is mounted by bearings 27 upon skid 9. The stub shaft bearings can be mounted on the respective skids by pedestals or, as illustrated, by connection with the respective housings B, C and D which in turn, as stated, are fixedly connected to the skids.

Means are provided for drivingly connecting each of the drive shafts to the respective ones of the stub shafts mounted upon the same skid as the drive shaft. Such connecting means are illustrated in FIG. 1 as comprising sprockets 28 mounted on the stub shafts and drive shafts and interconnected by chains 29. While reference is made to a sprocket and chain drive, the connecting means could take other forms where circumstances permitted, such as a pulley and belt or a gear drive.

Disconnectable means are provided to drivingly connect the stub shafts of each pair so that power can be transmitted from one stub shaft to the other and yet upon disconnection of such means, the individual skid mounted power units can be moved separately without dismantling any of the chain or belt drives between the various shafts and without any relative movement between two shafts which are connected together by a chain drive. In the illustrated forms, such disconnectable means comprises a simple coupling 30 and 31, one-half of each coupling being fixed to one stub shaft and one-half to the other stub shaft, the two halves being held together by a suitable bolt or other arrangement. In some cases, the disconnectable means could comprise clutches, such as a Fawick air clutch.

With the foregoing arrangement, it will be apparent that upon disconnecting coupling halves 30 and the appropriate eye-bolts 10, the No. 1 engine can be readily moved to a new location. Similarly, upon disconnection of coupling 31 and the appropriate eye-bolts, both No. 2 and No. 3 engines can be moved. Further, such movement of the individually mounted engines can take place without disturbing the alignment between drive shaft 13 and stub shaft 20, or between drive shaft 14 and stub shafts 21 and 22, or between drive shaft 15 and stub shaft 23. Thus, each of the shafts in each of these groups is maintained in a fixed position relative to the other shafts in the group insofar as alignment is concerned, both during movement of the individual power units and also during compounded operations of the units after they have been assembled together.

Various power take-offs can be provided from the compound drive assembly to drive various units such as draw works, pumps, etc. Thus, a driving element 35, such as a sprocket, can be fixed to shaft 13 to drive the draw works via chains 36. A suitable clutch 37 is preferably provided to selectively connect and disconnect the inboard and outboard portions of this drive shaft 13 so that, with the clutch disconnected, only the No. 1 engine is used to drive the draw works, or, with the clutch connected, additional engines can be compounded to drive the draw works. If desired, clutch 37 can be moved from shaft 13 to replace coupling 30 and in such arrangement, the same compounding operations could be achieved and yet the clutch could serve as the disconnectable connecting means between the stub shafts 20 and 21. Similarly, coupling 31 could be substituted by a clutch.

One or more pump or other drives can be connected to the compound drive assembly. In FIG. 1, the No. 1 pump drive is illustrated as including a pulley 38 and belts 39, the pulley being fixed to an extension of drive shaft 15. A clutch 40 can be inserted in shaft 15 to control operation of the No. 1 pump. The No. 2 pump drive is illustrated in FIG. 1 as including a pulley 41 and belts 42, the pulley being mounted upon a shaft 43 which can be considered an extension of stub shaft 22. Shaft 43, of course, is rotatably mounted upon bearings 44 which can be supported by suitable pedestals fixed to the base or skid 8. A suitable clutch 45 is disposed between shafts 22 and 43 to facilitate starting and stopping of the No. 2 pump.

If desired, a clutch (FIG. 3) can be provided between drive shaft 14 and the outboard sprocket 28 on such drive shaft. In this instance, this clutch is shown as a jaw clutch comprising a clutch part 28a keyed to the drive shaft and adapted to be slid therealong (as by an external control [not shown]) so that its teeth can engage and disengage teeth 28b on sprocket 28. The latter is, of course, rotatably mounted on the drive shaft as by bearings 28c.

With this arrangement of clutches, it will be seen that a number of compounding arrangements are possible and that the various power take-offs can be actuated at will. It will be understood that other types of clutches can be employed in different arrangements in accordance with the desires and requirements of the user of the compound drive assembly.

It will be noted that the driving connections from a drive shaft to the stub shafts mounted on the same skid to either side of the drive shaft are offset laterally from each other. Thus, in FIG. 1, sprockets 28 on drive shaft 14 are axially spaced apart on the drive shaft so that the drive connections with the stub shafts can be termed "inboard" and "outboard" drive connections. With this arrangement, it can be seen that the drive connections carried by skid 8, together with shaft 14, are arranged in a Z-shaped configuration. This Z-shaped configuration may be more readily apparent in FIG. 2 wherein the Z-shaped housings C and Ca emphasize the arrangement. This inboard-outboard arrangement has the advantage of not only providing a very compact assembly but also permitting additional power units to be added as desired while using a standard form of drive assemblies on each power unit intermediate the end units. Further, where there are two or more power units intermediate the end power units, the intermediate power units can be interchanged with each other as desired. Thus, in FIG. 2, a four-engine power supply is shown and it will be seen that the No. 3 engine unit (mounted on skid 8a) has a drive assembly which can be identical to that of FIG. 8 (except, of course, that the No. 2 engine unit has its skid extended and the No. 2 pump drive added). Due to this identity of arrangement, elements of the No. 3 engine power unit are numbered the same as corresponding elements of the No. 2 engine power unit except the suffix "a" has been added. Similarly, a fifth engine could be added at any desired position between the end power units. Further, the intermediate power units of FIG. 2 could be interchanged with each other without any modification so that the No. 2 pump drive, if desired, could be more closely adjacent to the No. 1 pump drive. Thus, it is possible to have any number of intermediate power units arranged in any desired sequence.

Referring now more specifically to FIG. 3, there is shown an arrangement whereby the stub shafts mounted on adjacent power units can be satisfactorily interconnected even though there may be some misalignment therebetween. Thus, at least one stub shaft of each pair, such as stub shaft 21, extends through an axially hollow drive element, such as sprocket 28, and has its ends flexibly connected to its companion stub shaft and to the side of the drive element opposite the companion stub shaft. While the flexible connections to the stub shaft 21 can take any one of numerous forms, they are here illustrated as comprising gear couplings. Thus, sprocket 28 has an extension 28d on which a flange 50 is fixedly mounted. Bolted to this flange is a companion flange 51 having a plurality of internal teeth 52 adapted to mesh with teeth 53 alternately disposed therebetween. Teeth 53 are carried by a collar 54 which is keyed to shaft 21. The opposite end of shaft 21 is connected to stub shaft 20 by a similar gear coupling. Thus, it will be seen that when adjacent skids are somewhat out of alignment with each other so that the rotational axis of stub shaft 20 is not exactly coaxially aligned with the rotational axis of sprocket 28, stub shaft 21 will rotate on an axis inclined at an angle with the axes of stub shaft 20 and sprocket 28.

While only one flexibly connected stub shaft is shown in detail in FIG. 3, it will be appreciated that one stub shaft of each pair of stub shafts can be so mounted. Thus, in FIG. 1, stub shaft 23 will be mounted in such fashion and when additional power units are added, as in FIG. 2, each of them will have at least one stub shaft flexibly mounted.

With this arrangement, it will be appreciated that adjacent power units can be moved to a side-by-side position in proximate alignment with each other. The coupling halves 50, 51 between companion stub shafts can be connected together even though one stub shaft may be as much as an inch or more out of lateral alignment with the other. In such case, the stub shaft within the hollow drive element is inclined at an angle with the axes of the other stub shaft and the drive element and yet is permitted to rotate in such position due to the flexible connections at its ends. Also, the arrangement is very compact. Thus, for example, the end of stub shaft 20 can be relatively close to drive element 28 and yet the effective length of its connection thereto (i.e. the length of stub shaft 21) is relatively long. This permits a minimum of angular inclination of stub shaft 21 for any given amount of lateral misalignment between the axes of stub shaft 20 and drive element 28.

From the foregoing it will be seen that this invention is one well adapted to attain all of the ends and objects hereinabove set forth, together with other advantages which are obvious and which are inherent to the apparatus.

It will be understood that certain features, and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A compound drive assembly adapted to be readily separated into individually transportable sections comprising a plurality of support bases, drive shafts rotatably mounted on the bases, a pair of axially aligned stub shafts between the drive shafts, means rotatably mounting one stub shaft on one base and the other stub shaft on an adjacent base, drive connections between one drive shaft and one stub shaft and between the other drive shaft and the other stub shaft, at least one of the drive connections including an axially hollow drive element rotatably supported by the base and mounted with one stub shaft extending therethrough, flexible means connecting opposite ends of said one stub shaft respectively to an adjacent end of the other stub shaft of the pair and to the drive element on its side remote from the other stub shaft whereby said one stub shaft can rotate about an axis inclined at an angle with the axis of rotation of the other stub shaft.

2. The assembly of claim 1 wherein the flexible means include a gear coupling.

3. A compound drive assembly comprising a pair of support bases adapted to be individually transported and then placed in proximate predetermined position relative to each other, a drive shaft rotatably mounted on one base, an axially hollow drive element rotatably supported on said one base with its rotational axis parallel to and laterally offset from that of the drive shaft, a shaft rotatively mounted on the other base so that it can be placed in proximate axial alignment with the drive element when the bases are in said position, a stub shaft extending through said drive element, a flexible connection between one end of the stub shaft and one of the drive element and the shaft on the other base whereby the rotational axis of the last mentioned shaft and of the drive element can be misaligned, and a drive connection between the drive element and the drive shaft.

4. The assembly of claim 3 wherein flexible connections are provided at both ends of the stub shaft respectively to the shaft on the other base and to the side of the drive element remote from the last mentioned shaft.

5. The assembly of claim 4 wherein the flexible connections are gear couplings.

6. A compound drive assembly adapted to be readily separated into individually transportable sections comprising a plurality of side-by-side support bases; drive shafts rotatably mounted on the bases parallel to each other; a pair of substantially axially aligned stub shafts disposed between each pair of drive shafts; means rotatably mounting one stub shaft of each pair on one base and the other stub shaft on such pair on an adjacent base; a plurality of drive connections, one between each stub shaft and an adjacent drive shaft, the drive connections being offset laterally from each other to provide inboard and outboard drive connections, and the inboard drive connections alternating with the outboard drive connections; and a releasable connection between adjacent ends of each pair of stub shafts whereby upon disconnection of the releasable connection the sections with their respective drive and stub shafts thereon can be readily transported without dismantling the drive connections, at least one of said drive connections including an axially hollow drive element with one stub shaft extending therethrough with opposite ends of such one stub shaft having connections to the other stub shaft of the pair and to the drive element on the side thereof opposite said other stub shaft, such connections of said one stub shaft including means for permitting rotation of said one stub shaft about an axis inclined at an angle with the axis of rotation of said other stub shaft.

References Cited in the file of this patent
UNITED STATES PATENTS

| | | |
|---|---|---|
| 2,576,872 | Young | Nov. 27, 1951 |
| 2,936,654 | Wilson | May 17, 1960 |